US007058887B2

(12) United States Patent
Cragun

(10) Patent No.: US 7,058,887 B2
(45) Date of Patent: Jun. 6, 2006

(54) AUDIO CLUTTER REDUCTION AND CONTENT IDENTIFICATION FOR WEB-BASED SCREEN-READERS

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 10/093,159

(22) Filed: Mar. 7, 2002

(65) Prior Publication Data

US 2003/0172353 A1 Sep. 11, 2003

(51) Int. Cl.
*G06F 15/00* (2006.01)

(52) U.S. Cl. .................. 715/517; 715/523; 704/270.1; 709/201

(58) Field of Classification Search ................ 709/201, 709/200; 715/523; 704/270.1; 379/88.17
See application file for complete search history.

(56) References Cited

U.S. PATENT DOCUMENTS

| | | | | |
|---|---|---|---|---|
| 5,555,343 | A | 9/1996 | Luther | 395/269 |
| 5,699,486 | A | 12/1997 | Tullis et al. | 395/2.79 |
| 5,884,266 | A | 3/1999 | Dvorak | 704/275 |
| 6,115,686 | A | 9/2000 | Chung et al. | 704/260 |
| 6,282,511 | B1 | 8/2001 | Mayer | 704/270 |
| 6,349,132 | B1 * | 2/2002 | Wesemann et al. | 379/88.17 |
| 2001/0032234 | A1 * | 10/2001 | Summers et al. | 709/201 |
| 2002/0178007 | A1 * | 11/2002 | Slotznick et al. | 704/270.1 |
| 2003/0115247 | A1 * | 6/2003 | Simpson et al. | 709/200 |
| 2004/0205614 | A1 * | 10/2004 | Keswa | 715/523 |

OTHER PUBLICATIONS

Daniel Billsus and Michael J. Pazzani, "A Personal News Agent that Talks, Learns and Explains", Department of Information and Computer Science, University of California, Irvine, CA 92697-Published by ACM 1999 US (whole document pp. 268-275).*

* cited by examiner

*Primary Examiner*—William Bashore
*Assistant Examiner*—Quoc A. Tran
(74) *Attorney, Agent, or Firm*—Patterson & Sheridan, LLP

(57) ABSTRACT

A method and apparatus for reading a web page according to a set of user-configurable settings. In one embodiment, a set of user-configurable settings configured for reading the web page is determined. An initial reading position on the web page is determined as specified by the user-configurable settings. The web page is then read from the initial reading position according to the set of user-configurable settings.

13 Claims, 12 Drawing Sheets

AUDIO CLUTTER REDUCTION AND CONTENT IDENTIFICATION FOR WEB-BASED SCREEN-READERS

BACKGROUND OF THE INVENTION

1. Field of the Invention

The present invention generally relates to data processing, and more specifically, to methods of programmatically reading web page content.

2. Description of the Related Art

Computer networks were developed to allow multiple computers to communicate with each other. In general, a network can include a combination of hardware and software that cooperates to facilitate the desired communications. One example of a computer network is the Internet, a sophisticated worldwide network of computer system resources.

Many networks, such as the Internet, are designed for use with a network browser to enable navigation between network addresses. A browser is an application program or facility that normally resides on a user's workstation and which is invoked when the user decides to access network addresses. A prior art Internet browser program typically accesses a given network address according to an addressing format known as a uniform resource locator (URL). When a user selects a particular URL, the browser retrieves a web page associated with that URL. FIG. 1 illustrates an embodiment of a typical web page 100. Once the web page is downloaded to a display screen, the user can read the content 110 displayed on that web page.

Many web pages, however, contain "clutter," such as, links 120 to other pages, menus 130 and/or advertisements 140 at the top of the page. If the user is uninterested in viewing the "clutter," he can simply skim through them and navigate directly to the content 110 of the page by using the scroll bar 150, mouse (not shown), or keyboard (not shown).

However, sight-impaired users have difficulty navigating to the area of interest, e.g., the content 110, due to their inability to view the web page. In general, sight-impaired users browse the web using a web page reader, such as Home Page Reader (HPR) by International Business Machines, Inc. of Armonk, N.Y. HPR uses text-to-speech processing and reads aloud the content of a web page to the sight-impaired user through a set of speakers. HPR provides the sight-impaired user some tools to navigate through the page, such as, a "skip to the next paragraph" function and a "skip to the next sentence" function, etc. However, none of the tools allows the sight-impaired user to avoid hearing the "clutter" on the page and go directly to the content of the page that is of interest to the user.

Some efforts have been made by many consortium of web page designers to assist the sight-impaired users in dealing with this situation. One accepted convention is to place a hidden hyperlink near the top of the page that states, "skip to main topic." This feature is helpful, but the sight-impaired user is still at the mercy of each web page designer to incorporate this feature into his web page.

Moreover, recently section 508 of the Rehabilitation Act Amendments of 1998 requires all United States federal agencies to make their information technology accessible to their employees and customers with disabilities. That is, all new IT equipment and services purchased by federal agencies must be accessible. This rule applies to all electronic equipment used in federal agencies (not just workstations). The law also gives federal employees and members of the public the right to sue if the government agency does not provide comparable access to the information and data available to people without disabilities. All state agencies that receive federal funds under the Assistive Technology Act of 1998 are also required to comply with section 508 requirements.

Therefore, there exists a need for improved methods and apparatus of reading web page content for sight-impaired users.

SUMMARY OF THE INVENTION

The present invention generally provides a computer program product, comprising a program which, when executed by a processor, performs an operation to determine an initial display position on a document. The operation includes the steps of: receiving the document; identifying a plurality of content elements in the document; and selecting one of the plurality of content elements as the initial display position. The computer program product further includes a signal bearing media bearing the program. In one embodiment, the operation further comprises the step of communicating the initial display position to a screen reading program. In another embodiment, the operation further comprises the step of communicating the initial display position to a personal digital assistant. In yet another embodiment, the content elements are selected from the group consisting of hyperlinks, menu elements, graphic elements, input fields, text elements and table cells.

In still another aspect, the present invention generally provides a method of reading a web page according to a set of user-configurable settings. In one embodiment, a set of user-configurable settings configured for reading the web page is determined. An initial reading position on the web page is determined as specified by the user-configurable settings. The web page is then read from the initial reading position according to the set of user-configurable settings.

In another embodiment, the present invention provides a computer-readable medium containing a program which, when executed by a processor, performs an operation of reading a web page. The operation includes the steps of: determining a set of user-configurable settings configured for reading the web page; determining an initial reading position on the web page as specified by the set of user-configurable settings; and reading the web page from the initial reading position according to the set of user-configurable settings.

In yet another embodiment, the present invention provides a computer that includes a memory containing a web page reading program; and a processor which, when executing the web page reading program, performs an operation comprising: determining a set of settings configured for reading the web page; removing unwanted material from the web page; determining an initial reading position on the web page as specified by the set of settings; and using the set of settings, reading the web page from the initial reading position.

BRIEF DESCRIPTION OF THE DRAWINGS

So that the manner in which the above recited aspects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
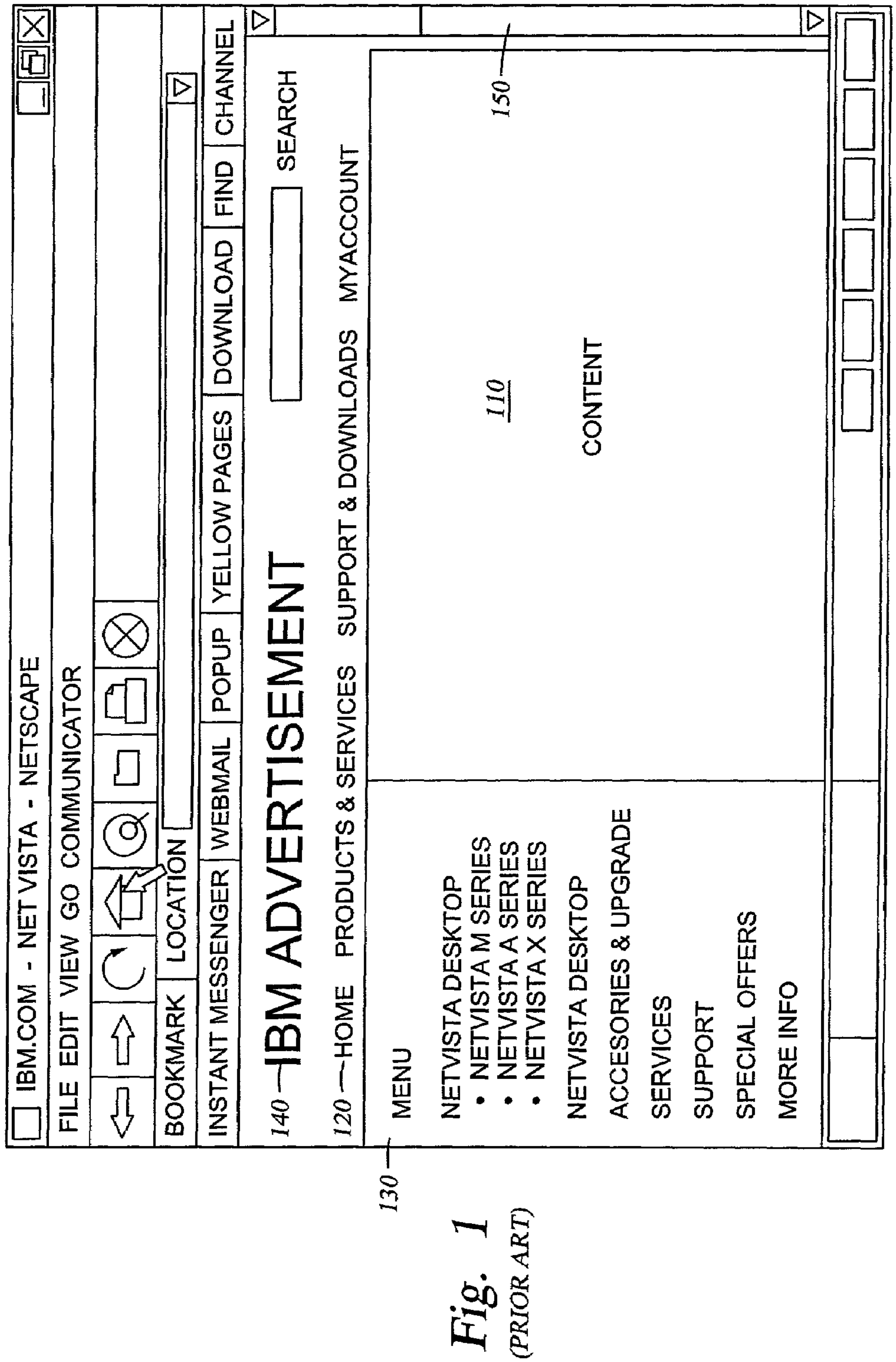
Fig. 1 ( PRIOR ART )
FIG. 1 illustrates an embodiment of a typical web page.

The present invention relates to a method of reading a web page, particularly for a sight-impaired user. In one embodiment, a set of settings configured for reading the web page is determined. Unwanted material is then skipped or removed from the web page. An initial reading position on the web page is then determined as specified by the set of settings. Using the set of settings, the web page is read from the initial reading position.

In determining the set of settings, a determination is made as to whether: a specific set of settings exists for the URL of the web page, the web page is a link page, the web page is an input page, the web page is a reading page, or the web page is an overview page. The specific set of settings is then retrieved to determine the initial reading position of the web page and to read the web page.

In one embodiment, one or more links have been marked as "read later links" in the settings. Thus, the web page is read from the initial reading position, skipping the read later links. Subsequently, the read later links are read. Finally, all unread words and links from the top of the web page to the initial reading position are read.

One embodiment of the invention is implemented as a program product for use with a computer system such as, for example, the networked system 200 shown in FIG. 2 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
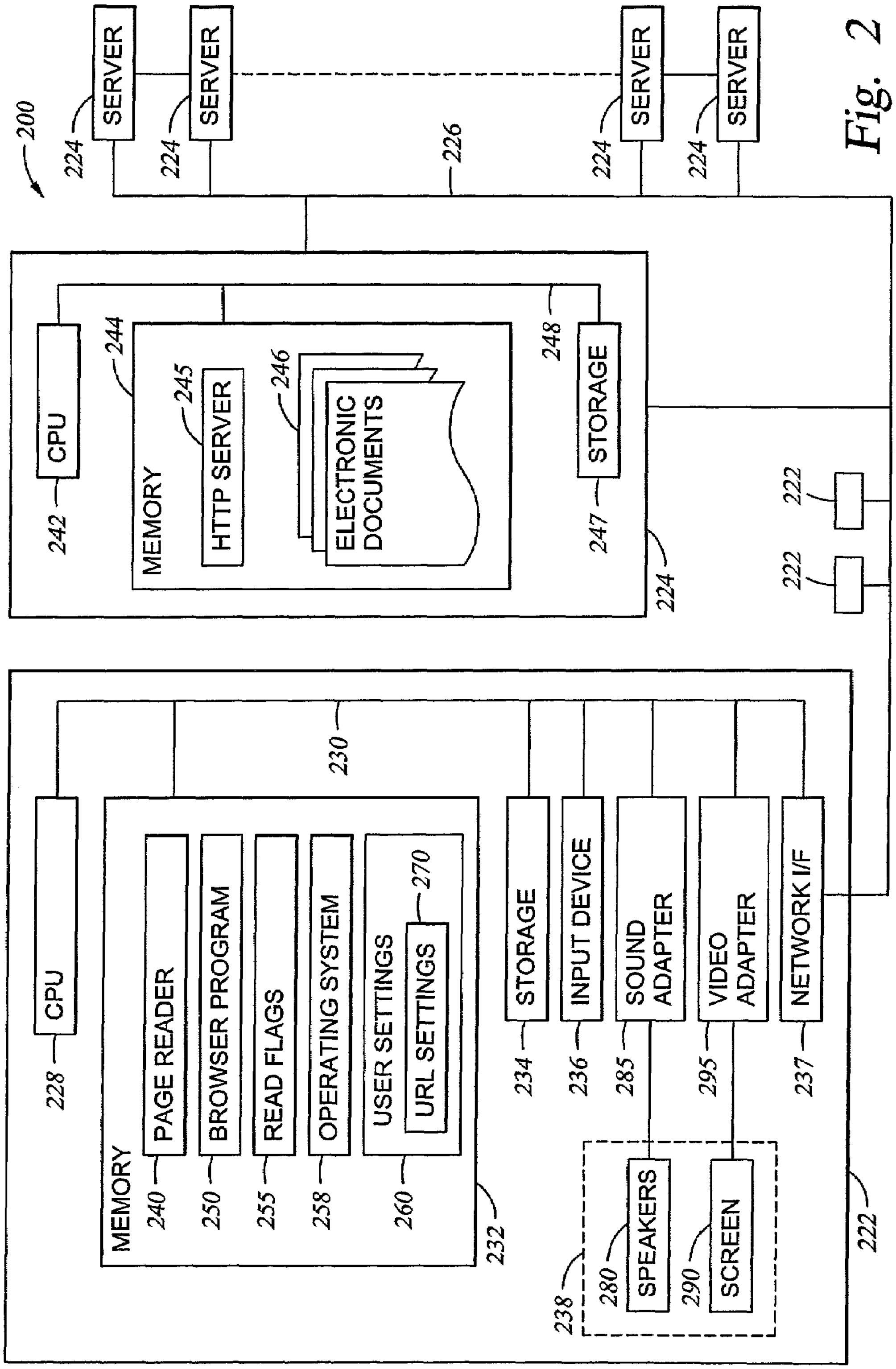
FIG. 2 depicts a block diagram of a networked system in which embodiments of the present invention may be implemented.

FIG. 2 depicts a block diagram of a networked system 200 in which embodiments of the present invention may be implemented. In general, the networked system 200 includes a client (e.g., user's) computer 222 (three such client computers 222 are shown) and at least one server 224 (five such servers 224 are shown). The client computer 222 and the server computer 224 are connected via a network 226. In general, the network 226 may be a local area network (LAN) and/or a wide area network (WAN). In a particular embodiment, the network 226 is the Internet.

The client computer 222 includes a Central Processing Unit (CPU) 228 connected via a bus 230 to a memory 232, storage 234, an input device 236, an output device 238, and a network interface device 237. The input device 236 can be any device to give input to the client computer 222. For example, a keyboard, keypad, light-pen, touch-screen, track-ball, or speech recognition unit, audio/video player, and the like could be used. The output device 238 can be any device to give output to the user, e.g., any conventional display screen 290 or set of speakers 280 along with their respective interface cards, i.e., video card 295 and sound card 285. Although shown separately from the input device 236, the output device 238 and input device 236 could be combined. For example, a display screen with an integrated touch-screen, a display with an integrated keyboard, or a speech recognition unit combined with a text speech converter could be used.

The network interface device 237 may be any entry/exit device configured to allow network communications between the client computer 222 and the server computers 224 via the network 226. For example, the network interface device 237 may be a network adapter or other network interface card (NIC).

Storage 234 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 232 and storage 234 could be part of one virtual address space spanning multiple primary and secondary storage devices.

The client computer 222 is generally under the control of an operating system 258, which is shown in the memory 232. Illustrative operating systems, which may be used to advantage, include Linux and Microsoft's Windows. More generally, any operating system supporting the browser functions disclosed herein may be used.

The memory 232 is preferably a random access memory sufficiently large to hold the necessary programming and data structures of the invention. While the memory 232 is shown as a single entity, it should be understood that the memory 232 may in fact comprise a plurality of modules, and that the memory 232 may exist at multiple levels, from high speed registers and caches to lower speed but larger DRAM chips.

Illustratively, the memory 232 includes a browser program 250 that, when executed on CPU 228, provides support for navigating between the various servers 224 and locating network addresses at one or more of the servers 224. In one embodiment, the browser program 250 includes a web-based Graphical User Interface (GUI), which allows the user to display web pages located on the Internet. The memory 232 further contains a web page reader program 240, when executed on CPU 228, reads the content of a web page according to the user settings 260 and/or specific URL settings 270. In a particular embodiment, the user settings 260 are user-configured and determine how the web page reader program 240 reads the content of a web page. Further, the specific URL settings 270 are specific URL's that have been selected to have their own set of settings. The details of the web page reader program 240, the user settings 260 and the URL settings 270 will be discussed in the following paragraphs. In another embodiment, the memory 232 further includes a set of read flags 255 to indicate the extent to which the page has been read so as to avoid reading the same material twice during a reading.

Each server computer 224 generally comprises a CPU 242, a memory 244, and a storage device 247, coupled to one another by a bus 248. Memory 244 may be a random access memory sufficiently large to hold the necessary programming and data structures that are located on the server computer 224. As shown, the memory 244 includes a Hypertext Transfer Protocol (http) server process 245 adapted to service requests from the client computer 222. For example, the process 245 may respond to requests to access electronic documents 246 (e.g., HTML documents) residing on the server 224. In one embodiment, the documents 246 are web pages each having an associated network address. The http server process 245 is merely illustrative and other embodiments adapted to support any known and unknown protocols are contemplated. The programming and data structures may be accessed and executed by the CPU 242 as needed during operation.

FIG. 2 is merely one hardware/software configuration for the networked client computer 222 and server computer 224. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages including HTML, the invention is not limited to particular language, standard or version. Accordingly, persons skilled in the art will recognize that the invention is adaptable to future changes in a particular markup language as well as to other languages presently unknown.

Figure 3:
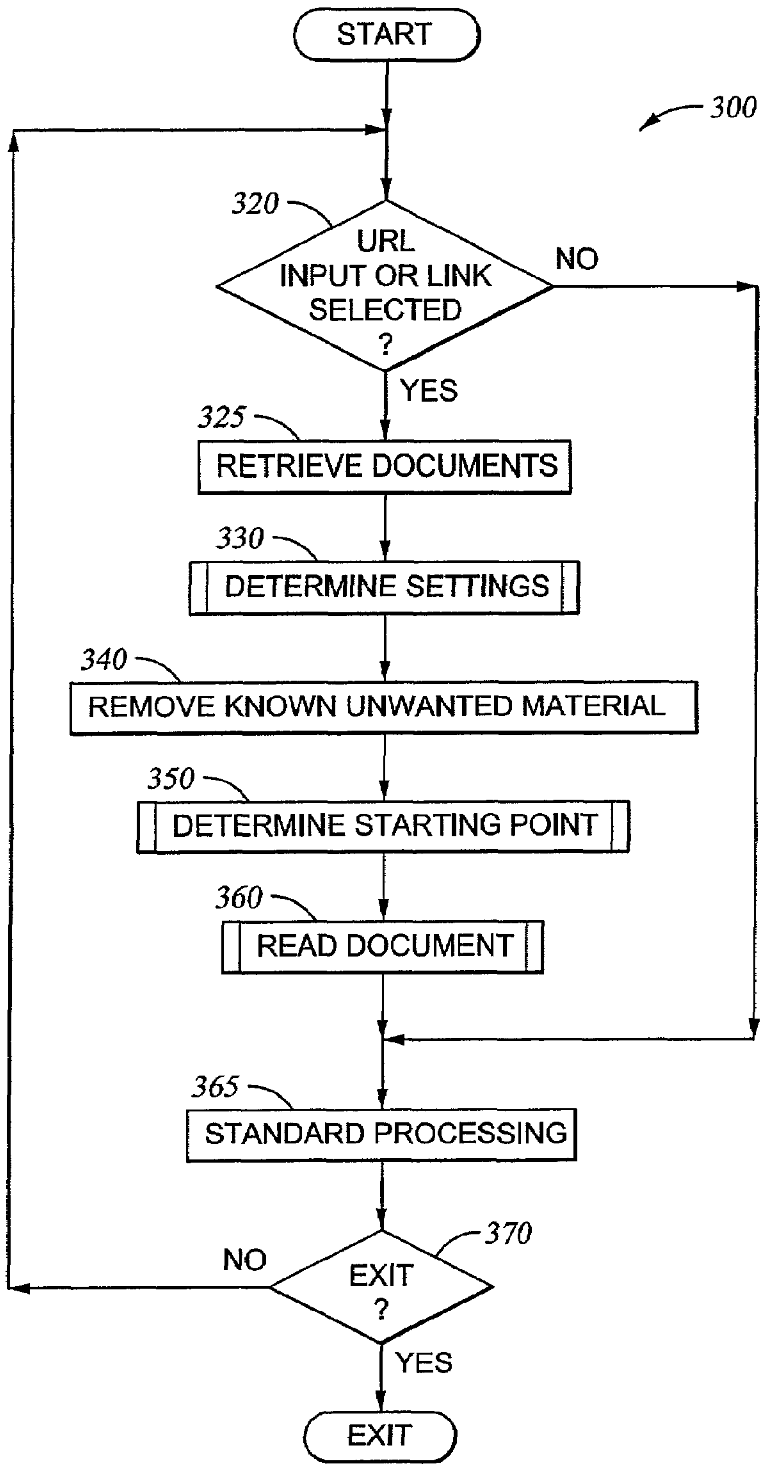
FIG. 3 illustrates the operation of the web page reader program in accordance with an embodiment of the present invention.

Referring now to FIG. 3, a method 300 illustrative of the operation of the web page reader program 240 in accordance with an embodiment of the present invention is shown. In one embodiment, the web page reader program 240 may be loaded and executed when the browser program 250 is launched. At step 320, a determination is made as to whether a link has been selected or a URL input has been received from a user, e.g., through the input device 236. If step 320 is answered negatively, processing proceeds to step 365. If, at step 320, a link has been selected or a URL has been inputted, the corresponding web page (i.e., one of the documents 246) is downloaded to the client computer 222, and displayed, as indicated by step 325. At step 330, the particular setting that will be used to read the web page is determined. Once the particular setting is determined, at step 340, any unwanted material is removed as specified by the user settings 260. That is, the unwanted material on the web page is identified as to be skipped when the web page is read. Some unwanted materials may include banner ads and certain URL's that are of no interest to the user, such as, doubleclick.com and adsrus.com. At step 350, the method 300 then determines a position on the web page as the initial/starting point/location for reading the web page. The document, i.e., the web page, is read at step 360. At step 365, any other conventional processing is be handled. At step 370, a determination is made as to whether the user has decided to exit the browser. If so, then the method 300 exits, as shown in step 380. If not, then the method 300 loops back to step 320.

Figure 4A:
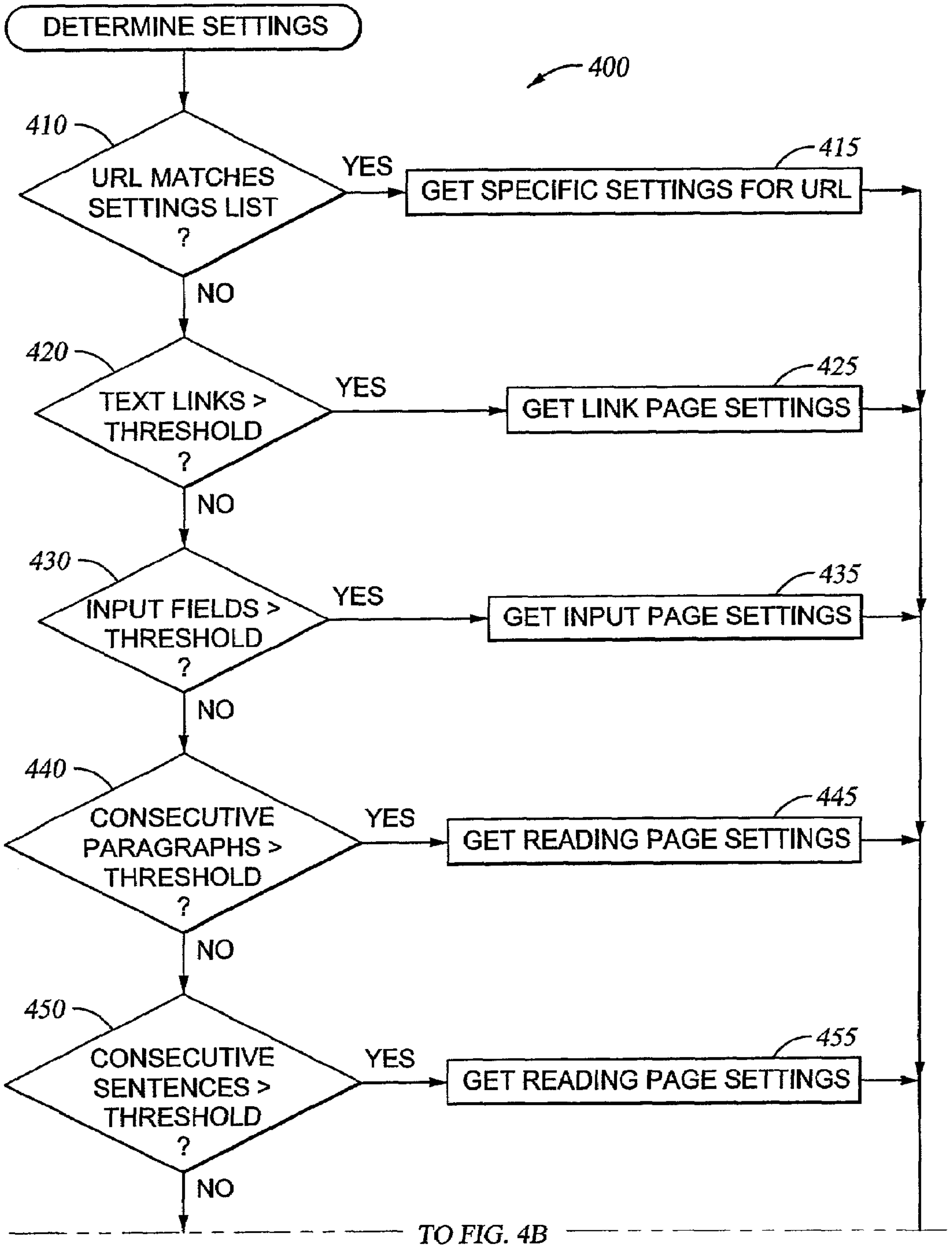
FIG. 4 illustrates the operation of a settings-determination step in accordance with an embodiment of the present invention.
Figure 4B:
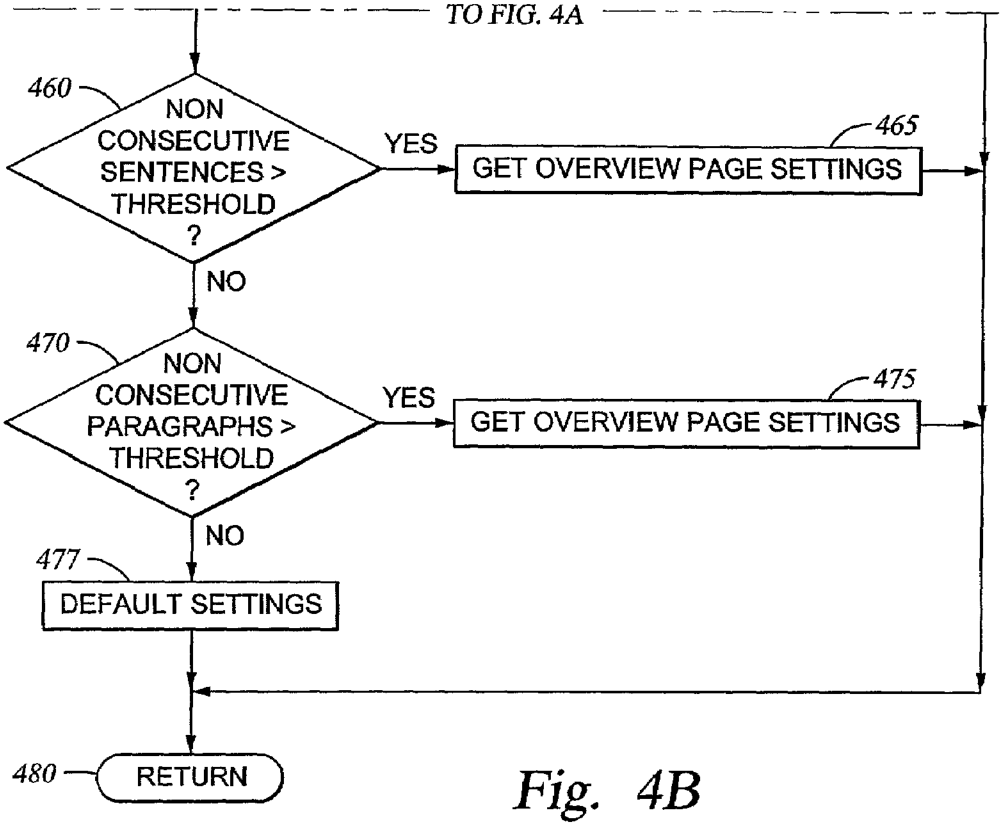

Referring now to FIG. 4, a method 400 illustrative of the operation of step 330 in accordance with an embodiment of the present invention is shown. In general, the invention contemplates processing a page according to an identifiable pattern exhibited by the page or according to user-specified settings for a particular URL. Accordingly, the method 400 initially determines the particular settings that will be used to read the web page by determining whether the user has previously assigned particular settings to this URL. More specifically, the web page reader program 240 determines whether the selected URL is one of the specific URL's in the specific URL settings list 270, as shown in step 410. If the answer is in the affirmative, then the specific set of settings configured to read that particular URL is retrieved, as shown in step 415, and the method 400 returns at step 480. If the selected URL is not one of the URL's listed in the URL settings list 270, then a determination is made as to whether the number of hyperlinks on the page exceeds a particular value, as shown in step 420. In another embodiment, a determination is made as to whether the ratio of hyperlinks to text on the web page exceeds a certain percentage. If the answer is in the affirmative, then the page is determined as a link page and a set of settings configured to read a link page is retrieved, as shown in step 425, and the method 400 returns at step 480. One example of a link page is a portal page, such as Yahoo! If the number of hyperlinks on the page does not exceed a particular number, then a determination is made as to whether the number of input fields on the page exceeds a certain threshold, i.e., a particular number, as shown in step 430. If the answer is in the affirmative, then the page is determined as an input page (such as a form) and a set of settings configured to read an input page is retrieved, as shown in step 435, and the method 400 returns at step 480.

If the number of input fields on the page does not exceed a certain threshold, then a determination is made as to whether the number of consecutive paragraphs on the page exceeds a certain threshold, as shown in step 440. If the answer is in the affirmative, then the page is determined as a reading page and the set of settings configured for reading a reading page is retrieved, as shown in step 445, and the method 400 returns at step 480. If the number of consecutive paragraphs on the page does not exceed the threshold, then a determination is made as to whether the number of consecutive sentences on the page exceeds a particular threshold, as shown in step 450. If the answer is in the affirmative, then the page is determined as a reading page and the set of settings configured to read the reading page is retrieved, as shown in step 455, and the method 400 returns at step 480.

If the number of consecutive sentences on the page does not exceed a particular threshold, then a determination is made as to whether the number of non-consecutive sentences on the page exceeds a certain threshold, as shown in step 460. If the answer is in the affirmative, then the page is determined as an overview page and a set of settings configured to read the overview page is retrieved, as shown in step 465, and the method 400 returns at step 480. If the number of non-consecutive sentences on the page does not exceed a certain threshold, then a determination is made as to whether the number of non-consecutive paragraphs exceeds a certain threshold, as shown in step 470. If the answer is in the affirmative, then the page is determined as an overview page and the set of settings configured to read the overview page is retrieved, as shown in step 475, and the method 400 returns at step 480. If the number of non-consecutive paragraphs does not exceed a certain threshold, then a default set of settings configured to read the page is retrieved (at step 477) and processing then continues to step 340 in FIG. 3.

Figure 5A:
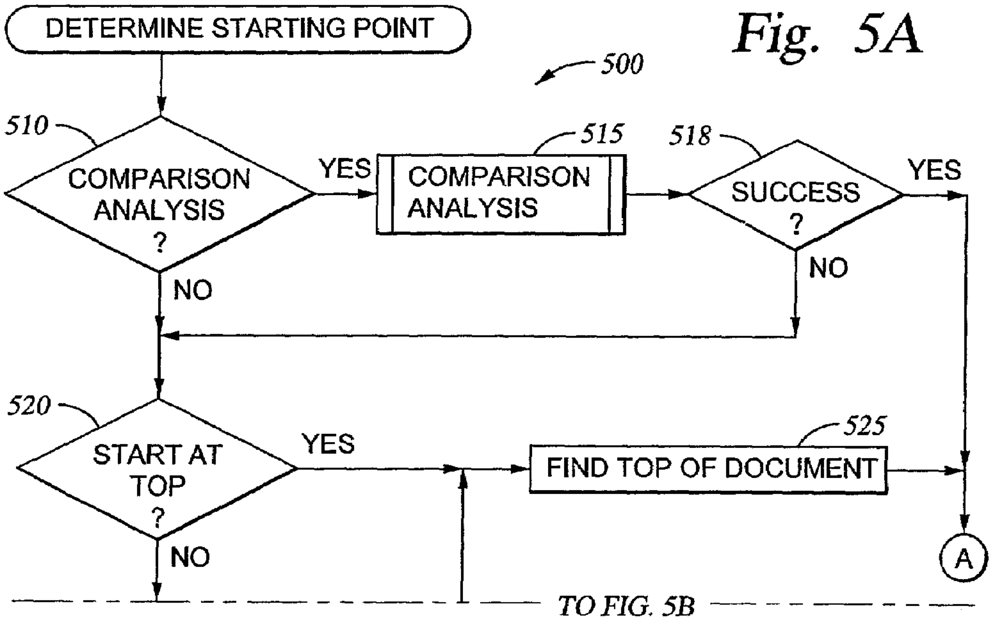
FIG. 5 illustrates the operation of an initial reading position-determination step in accordance with an embodiment of the present invention.
Figure 5B:
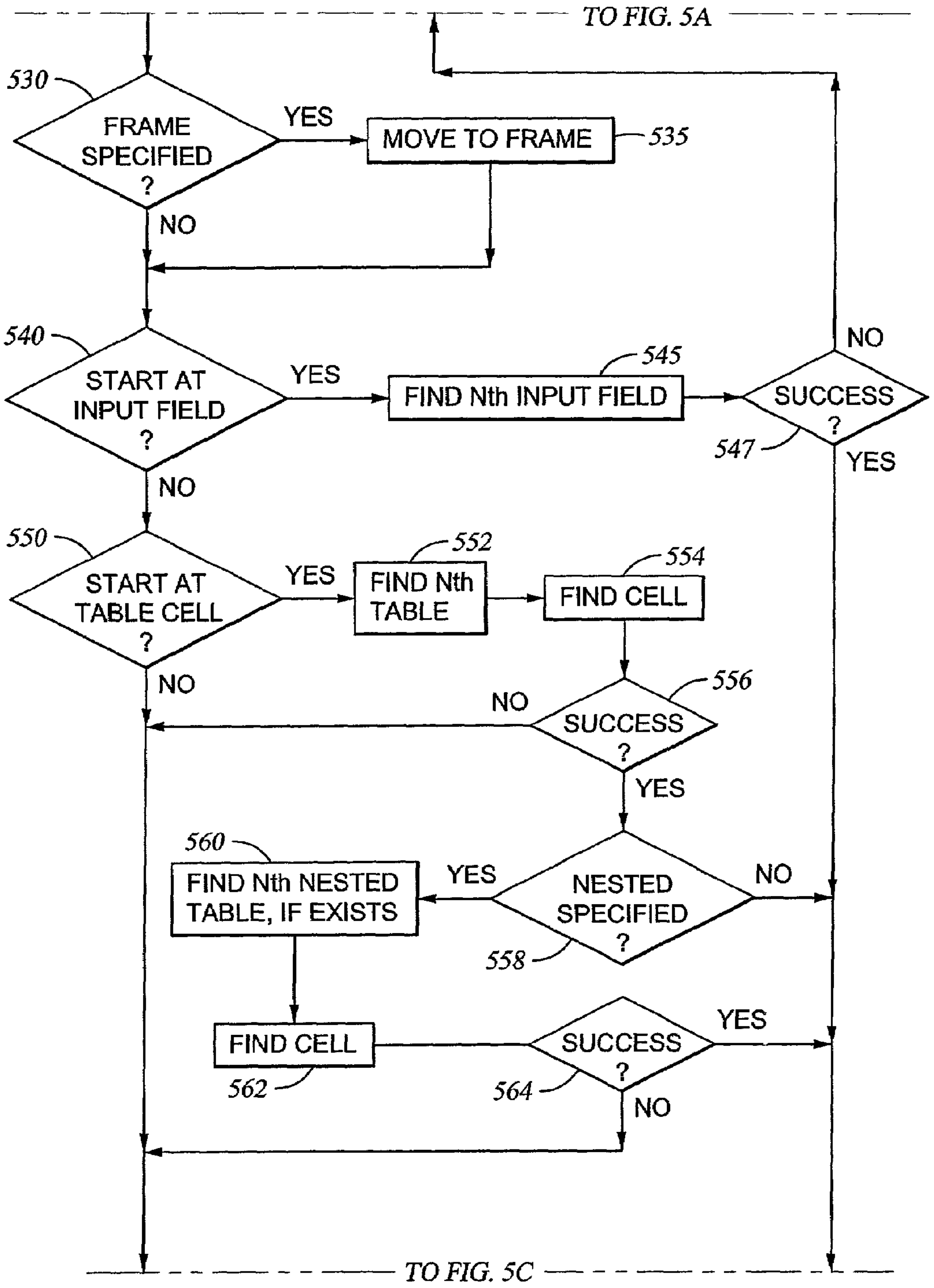
Figure 5C:
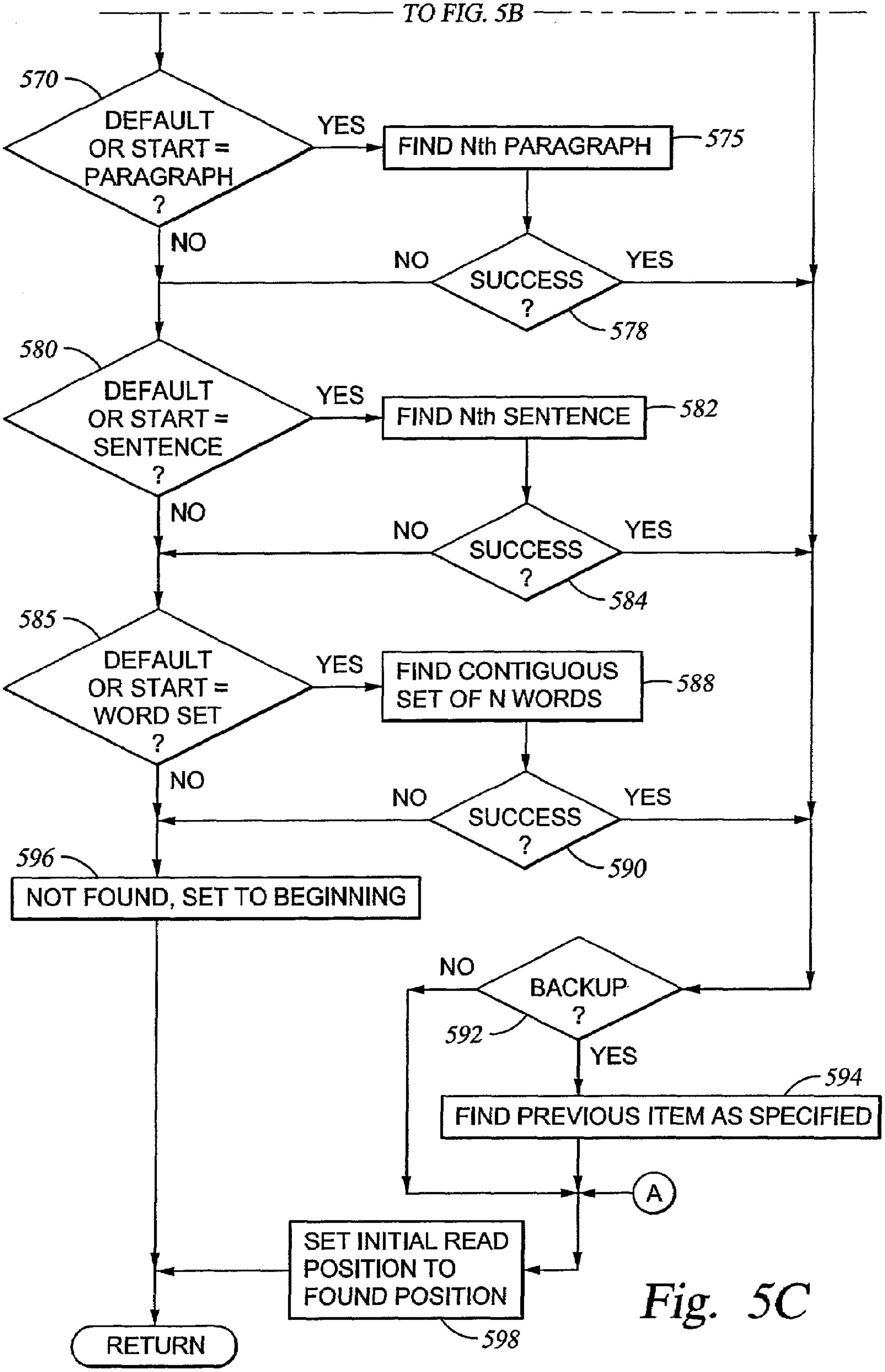

Referring now to FIG. 5, a method 500 illustrative of the operation of step 350 in accordance with an embodiment of the present invention is shown. In determining a position on the web page as the initial/starting point/location for reading the web page, the method 500 uses the preferences specified in the settings retrieved according to the method 400 to determine what types of analysis should be performed. At step 510, a determination is made as to whether the retrieved set of settings specifies using a comparison analysis method 700, which will be described in FIG. 7. If so, the comparison analysis is performed at step 515. If the comparison analysis is successful (at step 518), then processing continues to step 598, which sets the beginning of the comparison analysis result as the initial reading position. If the comparison analysis is unsuccessful or if the retrieved set of settings does not specify using the comparison analysis method, then a determination is made (at step 520) as to whether the retrieved settings specify that the initial reading position is at the top of the page. If the answer is in the affirmative, then the top of the page is located in step 525 and the top of the page is then set as the initial reading position, as indicated in step 598. In this regard, it should be understood that the user is not penalized by implementations of the invention even if the entire page is ultimately read, since this is the same result as would occur without the invention (although the order in which the page is read may differ). If the retrieved set of settings does not specify that the initial reading position is at the top of the page, then a determination is made as to whether the retrieved set of settings specifies a specific frame (in the web page) as the initial reading position, as indicated in step 530. If the answer is in the affirmative, then the specific frame is located in step 535 and the specific frame is then set as the initial reading position, as indicated in step 598. A frame is a formatting tool made available by markup languages, such as HTML. Frames are formatting features allowing a browser window to be divided into multiple display areas, each containing a different document.

If the retrieved set of settings does not specify a specific frame as the initial reading position, then a determination is made as to whether the retrieved set of settings specifies a particular input field as the initial reading position, as shown in step 540. At step 545, the particular input field is located. If the particular input field is successfully located at step 547, then processing continues to step 592 where a determination is made as to whether the retrieved set of settings requires backing up to a previous item. If the answer is in the affirmative, then the previous item is located, as shown in step 594. The previous item can be a sentence, a header, an image, a table row or a word set. The previous item is then set as the initial reading position, as indicated in step 598. If the particular input field is not found at step 547, then the top of the document is found in step 525. In this way, the invention contemplates handling a page which turns out to be different than the selected settings (in particular, a specific URL setting).

If the retrieved set of settings does not specify a particular input field as the initial reading position, the process continues to step 550 at which a determination is made as to whether the retrieved set of settings specifies a particular cell in a particular table as the initial reading position. If so, then at step 552 the particular table is located and at step 554 the particular cell is located. If the particular cell is successfully located (at step 556), then a determination is made (at step 558) as to whether the retrieved set of settings specifies the particular cell as a nested table. If so specified, then the nested table is located (step 560) and the ultimate cell residing within the nested table is located (step 562). If the cell was successfully located (step 564), processing continues to step 592, which was previously described. Otherwise, processing proceeds to step 570, describe below.

Processing also continues to step 592 if the retrieved set of settings does not specify that the particular cell located at step 554 is a nested table. If the retrieved set of settings does not specify a particular cell in a particular table as the initial reading position or if the particular cell was not successfully located at step 556, then processing proceeds to 570 where a determination is made as to whether the default settings are being used or whether the retrieved set of settings specifies a particular paragraph as the initial reading position. At step 575, the particular paragraph is located. If the particular paragraph is successfully located (step 578), then processing continues to step 592, which has been previously described. However, if the particular paragraph is not successfully located at step 578 or if the retrieved set of settings is not the default set or does not specify a particular paragraph as the initial reading position, then a determination is made as to whether the default settings are being used or the retrieved set of settings specifies a particular sentence as the initial reading position, as indicated in step 580. If so, the particular sentence is located at step 582. If the particular sentence is successfully located (step 584), then processing continues to step 592, which has been previously described. However, if the particular sentence is not successfully located at step 584 or if the retrieved set of settings is not the default set or does not specify a particular sentence as the initial reading position, then a determination is made as to whether the retrieved set of settings specifies a set of consecutive words as the initial reading position, as shown in step 585. If so, then the set of consecutive words is located, as shown in step 588. If the particular set of consecutive words is successfully located (step 590), then processing continues to step 592, which has been previously described. However, if the set of consecutive words is not successfully located at step 590 or if the retrieved set of settings is not the default set or does not specify a set of consecutive words as the initial reading position, then the initial reading position is set to the top of the page, as indicated in step 596.

Figure 6:
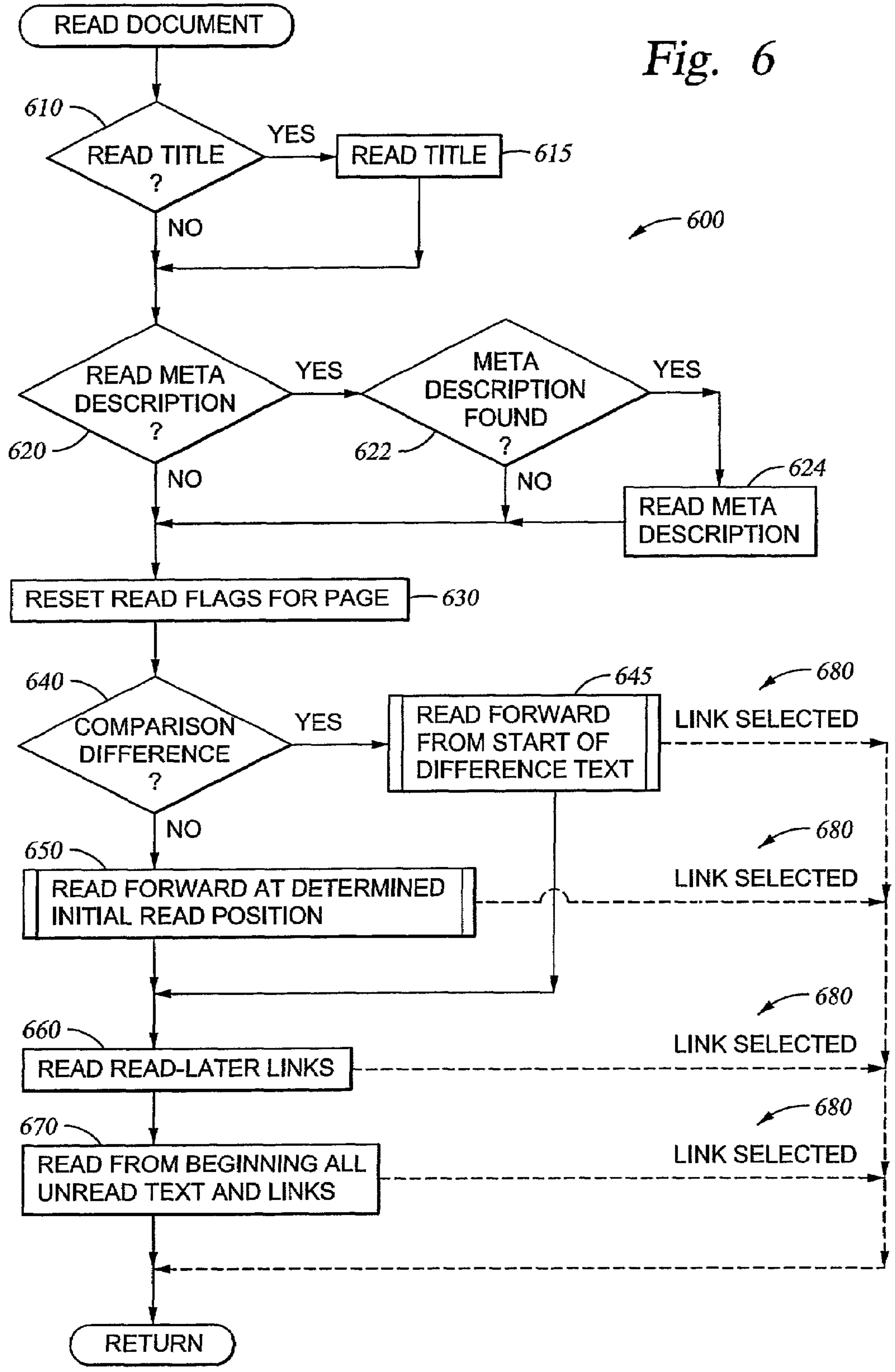
FIG. 6 illustrates the operation of a reading step in accordance with an embodiment of the present invention.

Once the initial reading position has been determined, processing now continues to method 600 of FIG. 6, which illustrates the operation of step 360 in more detail. At step 610, a determination is made as to whether the retrieved set of settings specifies reading the title of the retrieved web page. At step 615, the title is read. If the retrieved set of settings does not specify reading the title, then a determination is made as to whether the retrieved set of settings specifies reading the meta description, as shown in step 620. If so, then a determination is made as to whether the meta description is located at step 622. If located, then the meta description is read at step 624. At step 630, any read flags 255 for the page are reset. In one embodiment, the read flags 255 indicate which parts of the page have been read so as to avoid reading the same material twice. At step 640, a determination is made as to whether the comparison analysis operation 700 (performed at step 515), as will be described in FIG. 7, was successful. If so, then the web page is read beginning from the top of the comparison analysis result, as indicated in step 645. If the comparison analysis operation 700 was not successful, the web page is read beginning from the initial reading position, as shown in step 650. In one embodiment, the read operation of steps 645 and 650 comprise the read forward method 800, which will be described with reference to FIG. 8. At step 660, the links that have been specified as read later links by the retrieved set of settings are read. In one embodiment, read later links are links that are familiar to the user and that are rarely selected by the user, e.g., help.html and contactus.html. At step 670, all unread text and links from the beginning of the page to the initial reading position are read. In one embodiment, at the end of step 670, everything on the page will have been read. If a link is selected (step 680) from the material while reading the material, processing returns (i.e., continues to step 320).

Figure 7:
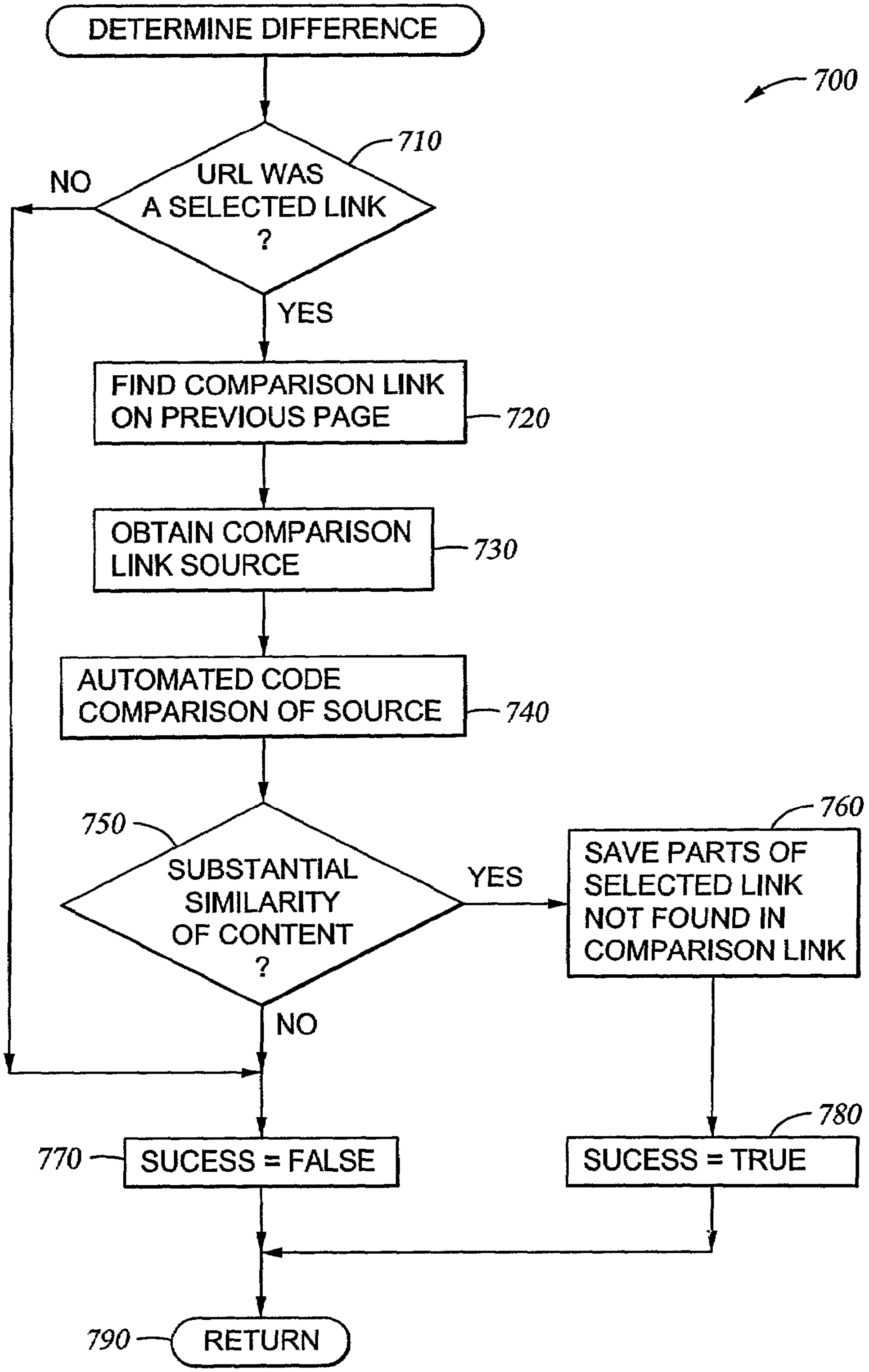
FIG. 7 illustrates the operation of a comparison analysis step in accordance with an embodiment of the present invention.

Referring now to FIG. 7, a method 700 illustrative of the comparison analysis operation of step 515 in accordance with an embodiment of the present invention is shown. At step 710, a determination is made as to whether the current page was navigated from a user-selected link (“selected link”) from another page, i.e., a previous page. If so, then another link (“comparison link”) on the previous page is selected, as shown in step 720. In one embodiment, the comparison link is located near or next to the selected link on the previous page. At step 730, the source of the comparison link (i.e., the source code of the page pointed to by the comparison link) is obtained. At step 740, the source code of the selected link is compared with the source code of the comparison link on the previous page. At step 760, a determination is made as to whether a substantial similarity of content exists between the source code of the selected link and the source code of the comparison link. If so, then the parts, i.e., text and links, on the page from the selected link that are not found on the page from the comparison link are saved as a comparison analysis result at step 760. At step 780, the success flag is set to true, which indicates that the comparison analysis is successful. However, if a substantial similarity of content does not exist between the page from the selected link and the page from the comparison link, then the success flag is set to false at step 770, which indicates that the comparison analysis is unsuccessful. In either case, the method 700 returns at step 790. In sum, the source code of a selected link is compared with a source code of another link from which the selected link is selected to determine whether the source codes are substantially similar. If so, then the reading material that is not found on the other link is to be read at step 645. Persons skilled in the art will recognize that other methods could be used to determine a comparison link such as is needed at step 730, including permutations of the original URL to find sufficiently similar comparison links.

Figure 8:
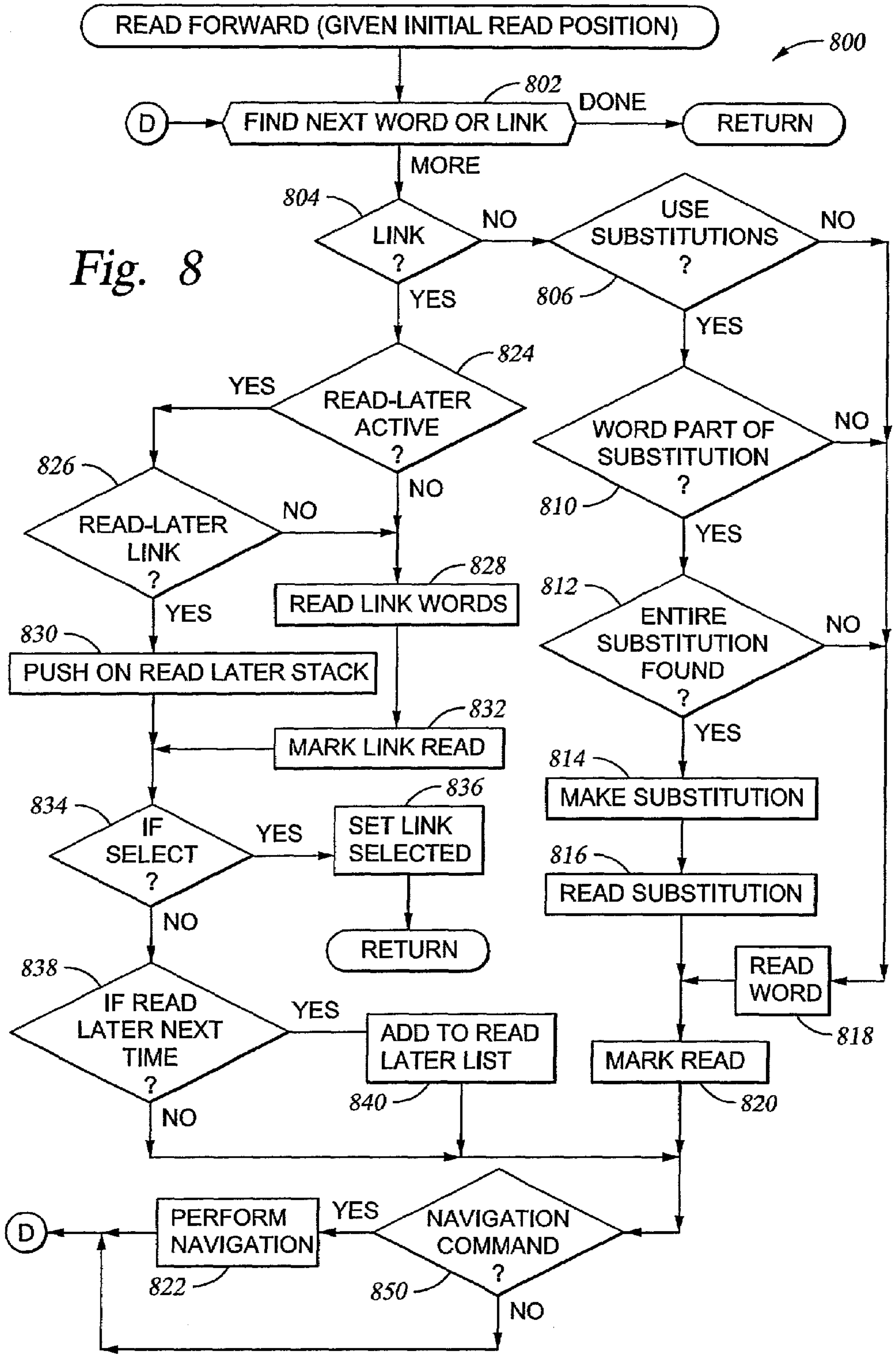
FIG. 8 illustrates the operation of a read forward step in accordance with an embodiment of the present invention.

Referring now to FIG. 8, a method 800 illustrative of the read forward operation of steps 645 and 650 in accordance with an embodiment of the present invention is shown. In general, the read forward method 800 reads a non-link item (e.g., a word or character) or a link at a time, determines whether to make a substitution for a non-link item if a non-link item is read, and determines various treatments of a link if a link is read. At step 802, the next word or link to be processed is found. At step 804, a determination is made as to whether the item to be read is a word or a link. If the item to be read is a link, then at step 824 a determination is made as to whether a read later flag is set to active. If so, then a determination is made as to whether the retrieved set of settings 270 indicates that the link is a read later link, as shown in step 826. If so, then the link is pushed on a read later stack, as shown in step 830. On the other hand, if the read later flag is not set to active or the retrieved set of settings does not indicate that the link is a read later link, then the words describing the link is read, as shown in step 828. At step 832, the link is marked as having been read. At step 834, a determination is made as to whether the link has been selected by the user, either while reading the link or after reading the link. If so, then the link is marked as having been selected at step 836 and processing continues to step 320. If the link has not been selected, then at step 838, a determination is made as to whether the user has marked the link as a read later link while reading the link or after reading the link. In one embodiment, the user indicates this by pressing a function key on the keyboard. At step 840, the link is added to the read later link list, as specified in the user settings 270.

If the item to be read is not a link, i.e., a word or a character, then a determination is made as to whether the user settings 260 specify to use substitutions when reading the word, as shown in step 806. If the user settings 260 specify to use substitutions, a determination is made as to whether the word is part of a substitution, as indicated by step 810. If the word is part of a substitution, then the method 800 attempts to locate the entire group of words to be substituted, as indicated by step 812. If the substitution is successfully located, then the substitution is made (step 814), the substitution is read (816), and the substitution (i.e., the substituted words) is marked as having been read (step 820). In one embodiment, the substitution at step 814 is made only after a determination is made that all the words in a row make up the substitution. In another embodiment, the substitution is an abbreviation for a set of words, e.g., “IBM” for “International Business Machines.” In another embodiment, the substitution is silence for certain characters, e.g., “” (underscore) or “/” (forward slash). On the other hand, if the user settings 260 do not specify to use substitutions, if the word is not part of a substitution, or if the substitution is not successfully located, then the word is read, as indicated by step 818, and the word is marked read, as indicated by step 820. In one embodiment, the read material (marked at steps 820 and 832) may be highlighted, underlined or otherwise visibly formatted to indicate to a user that it has been read.

At step 850, a determination is made as to whether a navigation command, e.g., go to the next sentence, go to the next paragraph, and go backward or forward, is received. If so, the navigation command is performed, as shown in step 822. Processing then continues to step 802 in which the next word or link is located.

Figure 9:
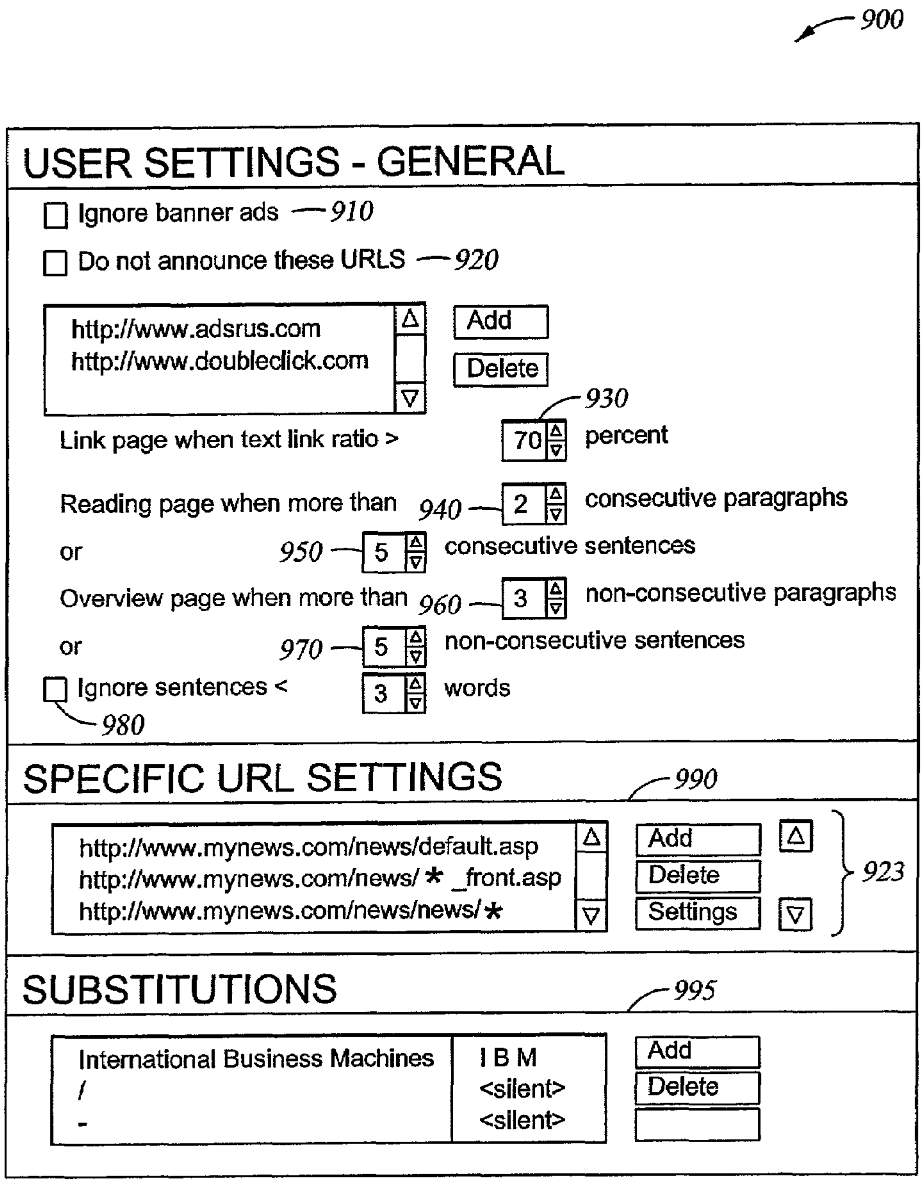
FIG. 9 illustrates a window dialog for the user settings in accordance with an embodiment of the present invention.

Referring now to FIG. 9, an illustration of a dialog window 900 for configuring the user settings 260 in accordance with an embodiment of the present invention is shown. The dialog window 900 includes settings for specifying unwanted materials, such as the setting 910 for ignoring banner ads and the setting 920 for not announcing certain URL's that are of no interest to the user. In one embodiment, the user is given the option to add or delete the URL's that are of no interest to him.

The dialog window 900 further includes the setting 930 for specifying the percentage of the text link ratio that is used in determining the number of hyperlinks on the page exceeding a particular number. The dialog window 900 further includes the setting for specifying the number of consecutive paragraphs threshold 940, the number of consecutive sentences threshold 950, the number of non-consecutive paragraphs threshold 960, the number of non-consecutive sentences threshold 970, and the setting 980 for ignoring sentences less than a certain number of words. The dialog window 900 further includes the list 990 of specific URL's or URL patterns/directories that have their own settings and the option to add or delete the URL's or reorder/sort the URL settings using sorting buttons 993. In the operation of step 410 (described above with reference to FIG. 4), the first matching pattern is used. The dialog window 900 further includes a list of substitutions 995 and the option to add or delete the substitutions, as previously discussed in FIG. 8.

Figure 10:
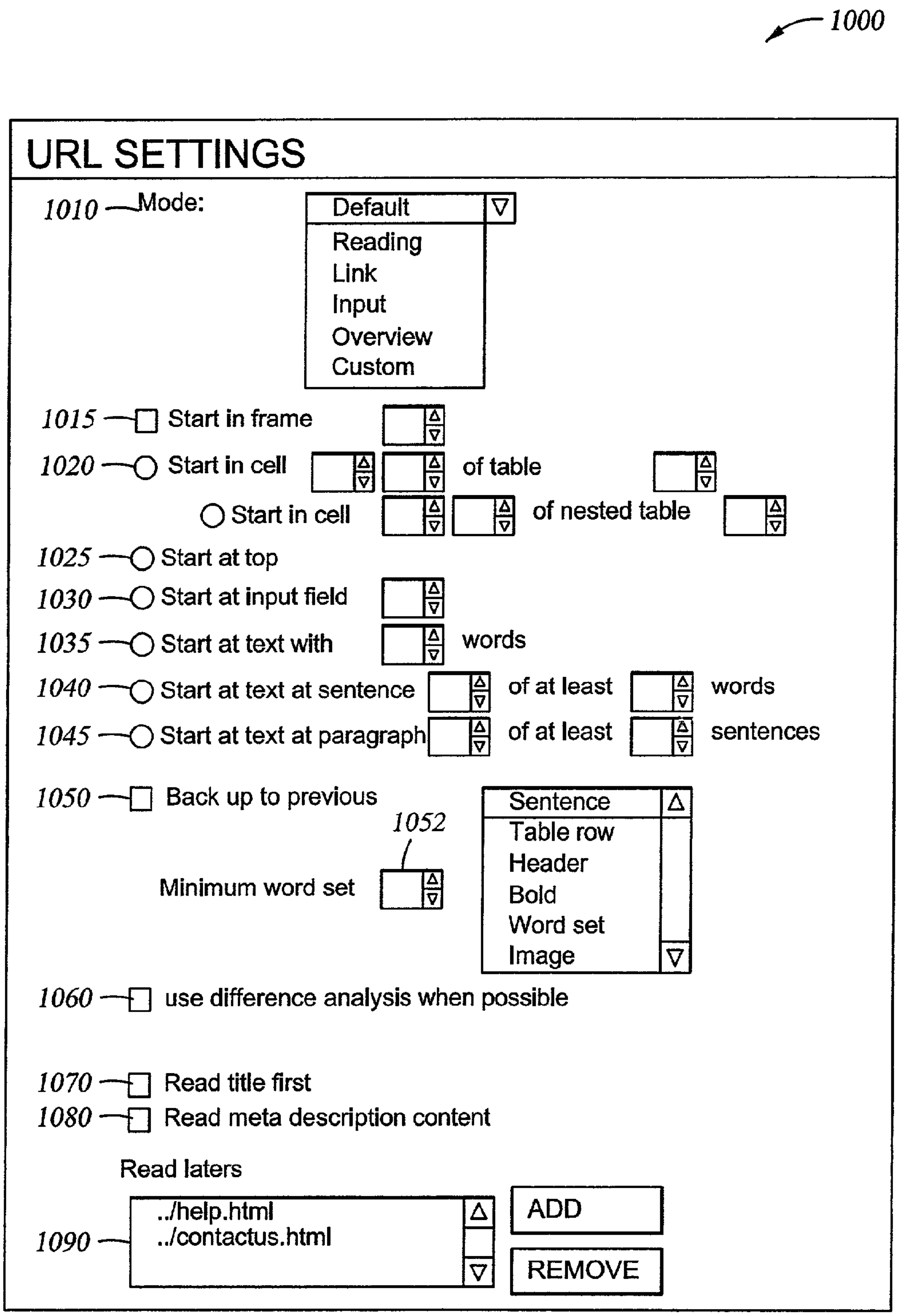
FIG. 10 illustrates a window dialog for various network address (e.g., URL) settings that will be used to read the web page in accordance with an embodiment of the present invention.

Referring now to FIG. 10, an illustration of a dialog window 1000 for various settings that will be used to read the web page, as discussed in FIG. 4, is shown. In one embodiment, the window dialog 1000 is configurable for specific URL settings or URL pattern settings. In another embodiment, the window dialog 1000 is also configurable for the default set of settings and types/pattern of URL pages. In accordance with one embodiment of the invention, the window dialog 1000 includes an option 1010 to select the particular mode, e.g., reading page (step 445), link page (step 425), custom page (step 415), overview page (step 465) and input page (step 435). In accordance with another embodiment of the invention, the window dialog 1000 includes settings for determining the initial reading position and settings for reading the page. The settings for determining the initial reading position include: a setting 1015 for starting in a particular frame; a setting 1020 for starting in a particular cell of a particular table or in a particular cell of a particular nested table; a setting 1030 for starting at the top of the page; a setting 1030 for starting at a particular input field; a setting 1035 for starting at a piece of text having a certain number of consecutive words; a setting 1040 for starting at a particular sentence having at least a certain number of words; a setting 1045 for starting at a particular paragraph having at least a certain number of sentences; a setting 1050 for backing up to a previous item; and a setting 1060 for using the comparison analysis method 700. If the setting 1050 is selected to back up to a previous word set, then a minimum word set is specified in a "minimum word set" field 1052. The settings for reading a page include: a setting 1070 for reading the title first; a setting 1080 for reading the meta description; and a setting 1090 for listing the read later links.

It should be noted that, in one embodiment, URL settings may be imported from some other network address. Such a network address may be, for example, a Web address. Allowing importation of URL settings facilitates sharing of settings which have been found to be optimum for a particular URL pattern.

Although the present invention has generally been described with reference to a screen reading device, it may be also embodied in other specific forms without departing from the essential spirit or attributes thereof. For example, the ability of the present invention to select an initial display position in a document may be used to optimize devices with limited display area and/or communication bandwidth, such as personal digital assistants ("PDA"), wireless devices, and the like.

While the foregoing is directed to embodiments of the present invention, other and further embodiments of the invention may be devised without departing from the basic scope thereof, and the scope thereof is determined by the claims that follow.

What is claimed is:

1. A computer-implemented method of reading a web page according to a predefined set of user-configurable settings, comprising:

upon retrieving the web page, selecting a setting from the set of user-configurable settings on the basis of an attribute of the web page, wherein the attribute is at least one of content of the web page and a URL of the web page;

determining an initial reading position on the web page as specified by the selected setting; and reading, by a reading program, the web page from the initial reading position according to the set of user-configurable settings, wherein the user-configurable settings are at least one of:

a URL setting configured to identify the web page on the basis of the URL;

a link page setting configured to identify the web page as a link page dependent on a quantification of a number of hyperlinks present in the web page;

an input page setting configured to identify the web page as an input page dependent on a quantification of a number of user input fields present in the web page;

a reading page setting configured to identify the web page as a reading page dependent on a quantification of a number of paragraphs of readable text present in the web page; and an overview page setting configured to identify the web page as an overview page dependent on a quantification of a number of sentences of readable text in the web page.

2. The method of claim 1, wherein selecting the setting comprises: selecting the URL setting, comprising determining at least one of whether a specific set of settings exists for the URL of the web page and whether the web page matches a predefined pattern of web page content.

3. The method of claim 1, wherein selecting the setting comprises: selecting the link page setting, comprising determining one of whether a number of links on the web page exceeds a predefined number and whether the ratio of the amount of text to the number of links on the web page exceeds a predefined percentage.

4. The method of claim 1, wherein selecting the setting comprises: selecting the input page setting, comprising determining whether a number of input fields on the web page exceeds a predefined number.

5. The method of claim 1, wherein selecting the setting comprises: selecting the reading page setting, comprising determining one of whether a number of consecutive paragraphs on the web page exceeds a first predefined number and whether a number of consecutive sentences on the web page exceeds a second predefined number.

6. The method of claim 1, wherein selecting the setting comprises: selecting the overview page setting, comprising determining one of whether the number of separate paragraphs on the web page exceeds a first predefined number and whether the number of separate sentences on the web page exceeds a second predefined number.

7. A computer-readable medium containing a program which, when executed by a processor, performs an operation of reading a web page according to a set of user-configurable settings, the operation comprising:

on the basis of the set of user-configurable settings, determining which predefined type of page the web page is, comprising at least one of:

determining whether the web page is a link page by determining one of whether a number of links on the web page exceeds a predefined number and whether the ratio of the amount of text to the number of links on the web page exceeds a predefined percentage;

determining whether the web page is an input page by determining whether a number of input fields on the web page exceeds a predefined number;

determining whether the web page is a reading page by determining one of whether a number of consecutive paragraphs on the web page exceeds a first predefined number and whether a number of consecutive sentences on the web page exceeds a second predefined number; and determining whether the web page is an overview page by determining one of whether the number of separate paragraphs on the web page exceeds a first predefined number and whether the number of separate sentences on the web page exceeds a second predefined number;

determining an initial reading position on the web page as specified by the set of user-configurable settings corresponding to the predefined type of page the web page is determined to be; and reading the web page from the initial reading position according to the set of user-configurable settings corresponding to the predefined type of page the web page is determined to be.

8. A computer-readable storage medium containing a program which, when executed by a processor, performs an operation of reading a web page according to a predefined set of user-configurable settings, the operation comprising:

upon retrieving the webpage, selecting a setting from the set of user-configurable settings on the basis of an attribute of the web page, wherein the attribute is at least one of content of the web page and a URL of the web nage;

determining an initial reading position on the web page as specified by the selected setting; and reading the web page from the initial reading position according to the set of user-configurable settings, wherein the user-configurable settings are at least one of:

a URL setting configured to identify the web page on the basis of the URL;

a link page setting configured to identify the web page as a link page dependent on a quantification of a number of hyperlinks present in the web page;

an input page setting configured to identify the web page as an input page dependent on a quantification of a number of user input fields present in the web page;

a reading page setting configured to identify the web page as a reading page dependent on a quantification of a number of paragraphs of readable text present in the web page; and an overview page setting configured to identify the web page as an overview page dependent on a quantification of a number of sentences of readable text in the web page.

9. The computer-readable storage medium of claim 8, wherein selecting the setting comprises: selecting the URL setting, comprising determining whether one of a specific set of settings exists for the URL of the web page, the web page is a link page, the web page is an input page, the web page is a reading page, and the web page is an overview page.

10. The computer-readable storage medium of claim 8, wherein selecting the setting comprises: selecting the link page setting, comprising determining one of whether a number of links on the web page exceeds a predefined number and whether the ratio of the amount of text to the number of links on the web page exceeds a predefined percentage.

11. The computer-readable storage medium of claim 8, wherein selecting the setting comprises: selecting the input page setting, comprising determining whether a number of input fields on the web page exceeds a predefined number.

12. The computer-readable storage medium of claim 8, wherein selecting the setting comprises: selecting the reading page setting, comprising determining one of whether a number of consecutive paragraphs on the web page exceeds a first predefined number and whether a number of consecutive sentences on the web page exceeds a second predefined number.

13. The computer-readable storage medium of claim 8, wherein selecting the setting comprises: selecting the overview page setting, comprising determining one of whether the number of separate paragraphs on the web page exceeds a first predefined number and whether the number of separate sentences on the web page exceeds a second predefined number.

* * * * *